United States Patent [19]
Millar et al.

[11] 3,995,753
[45] Dec. 7, 1976

[54] DISPENSING APPARATUS FOR PARTICULATE MATTER
[75] Inventors: Robert F. Millar, McCook; George Mack, Justice, both of Ill.
[73] Assignee: UOP Inc., Des Plaines, Ill.
[22] Filed: Dec. 19, 1975
[21] Appl. No.: 642,501

Related U.S. Application Data
[63] Continuation-in-part of Ser. No. 600,690, July 31, 1975, abandoned.
[52] U.S. Cl. .......................... 214/17 CB; 222/410
[51] Int. Cl.² .................. B65G 65/32; G01F 11/20
[58] Field of Search .......... 222/1, 410; 214/17 CB, 214/152; 239/681, 689

[56] References Cited
UNITED STATES PATENTS
2,822,097   2/1958   Lee .............................. 214/17 CB Primary Examiner—Allen N. Knowles
Assistant Examiner—Hadd Lane
Attorney, Agent, or Firm—James R. Hoatson, Jr.; Thomas K. McBride; William H. Page, II

[57] ABSTRACT
A dispensing apparatus for particulate matter which distributes said particulate matter, at substantially the same rate, uniformly across a given area.

17 Claims, 2 Drawing Figures

DISPENSING APPARATUS FOR PARTICULATE MATTER

RELATED APPLICATION

The present application is a Continuation-in-Part of our copending application, Ser. No. 600,690, filed July 31, 1975 now abandoned, all the teachings of which copending application are incorporated herein by specific reference thereto.

This invention relates to a dispensing apparatus which distributes particulate matter, at substantially the same rate, uniformly across a given area.

In the past, particulate matter has been loaded into vessels or dispensed by what is commonly referred to as the "sock" method. In this method, a hopper having an attached hose which extends to the bottom of the vessel or to the surface of the previously dispensed particulate matter. The hopper and hose are filled with particulate matter and the particulates are released at the bottom of the hose by slowly raising the hose. The resulting dispensed particulates are in the shape of a cone which, during the dispensing of particulates, can be distributed over the entire given area by raking.

Commercial catalytic reaction zone vessels are suitably loaded with catalytic particulates in a manner utilizing the dispensing apparatus of the present invention. Commercial catalytic reaction zone vessels or reactors varying in width or diameter from about 1 foot to about 15 feet or more, having length of from about 5 feet to about 70 feet or more, are loaded by the hereinabove described "sock" technique. One of the problems that is associated with loading reactors by this method is that the catalyst bed can contain excessive catalyst voids which can, during the use of the catalyst, bring about catalyst settling problems or "slumping," localized hot spots during the exothermic reactions of reactants and the necessity to utilize increased reactor volume. In addition, the sock technique requires increased times for loading a reactor since the hose through which the catalyst enters the reactor has to be continually adjusted upwardly in order to allow catalyst to flow. In addition to the above method, catalyst can be continually added through a hopper suspended above the catalyst surface which also results in the formation of a cone-shaped pile of catalyst upon the catalyst bed. As in the above method, the catalyst cone can be distributed over the catalyst bed by raking.

Thus, the settling of catalyst can change the overall volume of the catalyst bed thereby producing damage to equipment such as thermowells which have been inserted into the reactor for temperature measurements. In addition, the settling of catalyst can reduce the surface of the catalyst bed to a level whereby the thermowell is not in contact with the catalyst, thereby not allowing the reaction temperature to be monitored during the course of a reaction. Excessive voids in a sock-loaded catalyst bed cause poor gas, liquid, or gas-liquid distribution through the bed. The maldistribution often requires decreased throughput or increased temperatures, since the resulting catalyst utilization is low and product specifications may not be met. Settling problems associated with sock-loaded beds may result in damage to other reactor internals, such as baskets, redistribution trays, catalyst supports and quench spargers.

An additional problem associated with the prior art method of charging catalyst is that for a given reactor volume the amount of catalyst which can be charged is determined by the final catalyst density. Thus, a means for increasing a bulk density of catalyst present in a reaction zone would allow for increased throughput of reactants at the same severity or the same throughput at lower severity. Thus, more severe reaction conditions and/or increased throughput can be obtained for a given reaction zone volume if an increase in bulk density of the catalyst can be achieved.

It is therefore, an object of this invention to increase catalyst utilization in catalytic reaction zones.

Prior art, viz., U.S. Pat. Nos. 3,718,579 and 3,668,115 teaches that catalyst utilization and bulk density is increased by a process for charging catalyst particles to a reactor which comprises charging to the reactor in downflow relationship to said reactor at an average free fall distance of the catalyst particles through a gaseous medium to the catalyst surface of at least about 1 foot and distributing the catalyst particles over the entire catalyst bed surface at substantially the same rate of fill.

Although the prior art is cognizant that the hereinabove described method will increase catalyst utilization in catalytic reaction zones, it has failed to visualize an actual device which can easily and most fully exploit such a method. The prior art has suggested a method for charging the catalyst to the reactor which is effected by allowing catalyst particles to flow by means of gravity from a conical hopper onto a conical diverter which is mounted in the hopper outlet. Although the diameter of the base of the conical diverter is to be adjusted to compensate for the reactor diameter, and although this diverter contains apertures through which a fraction of the catalyst may drop, it appears that the desired distribution of particles would not be obtained. With a modicum of imagination, the most casual observer will notice that it is highly unlikely that uniform distribution of particles will be achieved by merely dropping the particles upon a conical diverter. This inability should be especially apparent when the diameter of the reaction zone is 12 or more feet in diameter. And even with smaller diameter reaction zones, the probability that the deposition of particles upon the area directly below the conical diverter whose size will be maximized to distribute in the outer periphery of the catalyst zone will be at the same rate as the area without the penumbra of the diverter is slim. Therefore, if the desired distribution cannot be achieved, the benefits of such distribution will obviously not be enjoyed. In response to this dilemma, we have found a device which eliminates the above-mentioned infirmities and which permits true uniform distribution of catalyst particles in a catalytic reaction zone to yield a substantial improvement in bulk density approaching the maximum bulk density of the catalyst. In addition, the increase in bulk density produces a rigid catalyst bed with a substantially reduced tendency toward settling. Of additional importance is the fact that the invention provides for the preparation of a catalyst bed with minimum formation of catalyst fines. Thus, the formation of catalyst fines is in general below one percent based on the total volume of catalyst charged and generally below 0.5 percent by volume.

A principal object of the present invention is to provide a dispensing apparatus for particulate material, the particles thereof having a nominal diameter comprising a storage container and a rotatable discharge member communicating with said storage container, said discharge member being generally tubular and having closed ends and an opening in its center for receiving said particulate material from said storage container, said discharge member including elongated discharge openings along portions of its length between its center and each of its ends, said openings being located on the trailing said portion of said rotatable discharge member, said openings being generally tapered and having an increasing width in an outwardly extending direction, the minimum width of said openings being at least 125% of the nominal diameter of the particulate material being distributed.

Another object of the present invention is to provide a dispensing apparatus for particulate material, the particles thereof having a nominal diameter comprising a storage container and a rotatable discharge pipe extending downwardly therefrom, said pipe being rotatable discharge member communicating with said storage container, said discharge member being generally tubular and having closed ends and an opening in its center for receiving said particulate material from said storage container, said discharge member including elongated discharge openings along portions of its length between its center and each of its ends, said openings being located on the trailing side portion of its ends, said openings being located on the trailing side portion of said rotatable discharge member, said openings being generally tapered and having an increasing width in an outwardly extending direction, the minimum width of said openings being at least 125% of the nominal diameter of the particulate material being distributed and the maximum width of said openings being sufficient to permit said particulate material to be loaded at a rate of from about 100 to about 1500 lb/hr-ft$^2$.

Yet another object of the present invention is to provide a method for loading particulate material into an annular vessel and distributing said particulate material at substantially the same rate, uniformly across the area of said vessel by means of a dispensing apparatus comprising a storage container and a rotatable discharge pipe extending downwardly therefrom, said pipe being a rotatable discharge member communicating with said storage container and mounted for rotation relative to said storage container, said discharge member being generally tubular and having closed ends and an opening in its center for receiving said particulate material from said storage container, said discharge member including elongated discharge openings along portions of its length between its center and each of its ends, said openings being generally tapered and having an increasing width in an outwardly extending direction, the minimum width of said openings being at least 125% of the nominal diameter of the particulate material being distributed.

Still another object of the present invention is to provide a method for loading particulate material into an annular vessel and distributing said particulate material, at substantially the same rate, uniformly across the area of said vessel by means of a dispensing apparatus comprising a storage container and a rotatable discharge pipe extending downwardly therefrom, said pipe being a rotatable discharge member communicating with said storage container and mounted for rotation relative to said storage container, said discharge member being generally tubular and having closed ends and an opening in its center for receiving said particulate material from said storage container, said discharge member including elongated discharge opening along portions of its length between its center and each of its ends, said openings being generally tapered and having an increasing width in an outwardly extending direction, the minimum width of said openings being at least 125% of the nominal diameter of the particulate, material being distributed and the maximum width of said openings being sufficient to permit said particulate material to be loaded at a rate of from about 100 to about 1500 lb/hr-ft$^2$.

A particular advantage for the use of catalyst charged with the device of this invention is in various hydrocarbon conversion processes such as hydrogenation, reforming, hydrocracking, polymerization, hydrodesulfurization, dehydroqenation, etc., wherein such hydrocarbon conversion processes are carried out in a non-fluidized catalyst bed reactor, which includes fixed bed reactors and moving bed reactors. This invention is particularly advantageous with hydrodesulfurization, hydrocracking, hydrogenation and reforming processes. A particularly preferred application of this invention is with reforming and hydrogenation processes. The various process conditions of temperature, pressure and space velocity vary according to the process and such conditions include those well known to those skilled in the above-mentioned processes.

An additional advantage of increased bulk density of loaded catalyst is that catalyst life may be extended for the same throughout and severity. This extension of catalyst life is a result of the tangible effect of the increased weight of catalyst in a fixed reactor volume as well as the less tangible effect of uniform gas, liquid, or gas-liquid distribution which coincides with the more uniform voidage of a densely-loaded catalyst bed. Longer catalyst life results in a longer unit run length.

Furthermore, dense loading of all reactors in an intergrated refinery would provide a means for predicting, controlling and optimizing the occurrence of turnaround, based on the premise that catalyst life in each reactor of the refinery network would become a predictable function of tangible factors such as catalyst properties, throughput and operating severity. Intangible effects associated with maldistribution, settling and hot-spots would be minimized by dense catalyst loading.

In a particularly preferred embodiment, the utilization of this particle dispensing apparatus provides for an improved hydrogenation process wherein a hydrogenation catalyst is charged to a reactor with the present invention; then hydrogen and hydrogenatable organic material, for example, a petroleum hydrocarbon, are contacted with said hydrogenation catalyst and a hydrogenated organic material is recovered. Thus, the hydrogenation process provides for allowing more throughput at the same severity for a given reactor and for greater catalyst weight per volume of reactor. The increase in catalyst bulk density, therefore, allows for the construction and use of smaller and less expensive reactors for a given throughput.

Our apparatus is used to charge catalyst particles to a reactor in downflow relationship to said reactor. In general, reactor sizes varying between about 1 to about 16 feet, preferably from about 2 to about 13 feet in diameter, and from about 5 to about 125 feet, more preferably from about 10 to about 75 feet in length can be charged. The rate of fill of the reactor can be nonuniform. However, it is preferred that the rate of fill be uniform and that after a given rate of fill is established, that this rate of fill be maintained while preparing the catalyst bed. The catalyst particles are introduced into the reactor at a point such that the distance to the catalyst surface formed as the catalyst particles are introduced through a gaseous medium provides an average free fall distance of catalyst particles of at least about 1 foot, more preferably an average free fall distance of from about 5 to about 125 feet and still more preferably from about 10 to about 70 feet. The gaseous medium in general is air, or depending on the catalyst, an inert medium such as nitrogen. Thus, in general the catalyst particles fall individually to the catalyst surface as the catalyst bed is formed. The catalyst particles are distributed over the surface area of the catalyst bed as it is formed such that the catalyst surface arises at a substantially uniform rate. The catalyst particles are distributed in order to produce a catalyst surface which has a difference between the highest portion of the catalyst surface and the lowest portion of the catalyst surface which is less than 10 percent of the diameter of the catalyst bed, that is a substantially flat surface, more preferably less than 5 percent and still more preferably less than 1 percent. One of the most commonly used configurations utilized as vessels or reactors is the cylinder with a circular, horizontal cross-section. However, the apparatus of the present invention is also highly suitable for loading particulate matter into a circular vessel which has an annular horizontal cross-section.

The term "rate of fill" implies the rise in bed height and may be expressed with units of feet per hour (ft/hr). Another term, particle flux, is convenient to characterize the features of the loading speed and is defined as the pounds of catalyst particles dropped on an area of one square foot in one hour (lb/ft²-hr). It has been found that there is a certain particle flux most favorable for optimal loading of a given catalyst. Particle flux and rate of fill are related by the catalyst loaded bulk density:

$$\frac{\text{Flux}, \frac{lb}{ft^2\text{-hr.}}}{\text{Loaded } ABD, \frac{lb}{ft^3}} = \text{Rate of Fill, ft/hr}$$

We have found that a flux between 100 and 1500 lb/hr-ft² is preferred for increasing the catalyst loaded bulk density, and that more preferable results are obtained for most catalysts using a flux between 300 and 1000 lb/hr-ft².

The above rates of fill, free fall distance, and uniform distribution of the catalyst within the above preferred ranges are preferred since they provide for approaching substantially the maximum bulk density achievable for a given catalyst bed. The reactor sizes which are preferred are those reactors which, in general, are utilized in commercial processes such as hydrogenation, reforming and hydrocracking.

This invention is applicable to catalyst particles which are spheres, pills, extrudates, crystals, cylinders, etc. In general, the particle diameter should not be greater than 3% of the reactor diameter and, preferably with a diameter of from about 1/64 to about ½ of an inch, more preferably from about 1/16 to about ¼ of an inch. Catalyst particle diameter refers to the nominal particle dimension in the case where the particle is not spherical.

A wide variety of solid catalysts may be charged to catalytic reaction zones with the apparatus of the present invention such as oxidation, hydrodesulfurization, hydrocracking, cracking, reforming and hydrogenation catalysts. Typical examples of hydrodesulfurization catalysts comprise any of the transitional metals, metal oxides, metal sulfides, or other metal salts which are known to catalyze hydrodesulfurization reactions, and are not poisoned by hydrogen sulfide or other sulfur compounds. The preferred catalysts comprise the oxides and/or sulfides, as for example the oxides or sulfides of molybdenum, tungsten, iron, cobalt, nickel, chromium and the like. Vanadium compounds may also be employed in some cases. A particularly active combination consists of a Group VI-B metal oxide or sulfide with a Group VIII metal oxide or sulfide. For example, compositions containing both molybdenum oxide and cobalt oxide, molybdenum oxide and nickel oxide, tungsten sulfide and nickel sulfide, and the like may be employed.

A particularly active catalyst consists of the composite known as cobalt molybdate which actually may be a mixture of cobalt and molybdenum oxides wherein the atomic ratio of Co and Mo may be between about 0.4 and 5.0. This catalyst, or any of the above catalysts may be employed in unsupported form, or alternatively it may be suspended on a suitable adsorbent oxide carrier such as alumina, silica, zirconia, thoria, magnesia, titania, bauxite, acid-activated clays, or any combination of such materials.

Typical examples of hydrocracking catalysts are crystalline metallic aluminosilicate zeolites, having a platinum group metal (e.g., platinum or palladium) deposited thereon or composited therewith. These crystalline zeolites are characterized by their highly ordered crystalline structure and uniformly dimensioned pores, and have an aluminosilicate anionic cage structure wherein alumina and silica tetrahedra are intimately connected to each other so as to provide a large number of active sites, with the uniform pore openings facilitating entry of certain molecular structures. It has been found that crystalline aluminosilicate zeolites, having effective pore diameter of about 6 to 15, preferably 8 to 15 Angstrom units, when composited with the platinum group metal, and particularly after base exchange to reduce the alkali metal oxide (e.g., $Na_2O$) content of the zeolite to less than about 10 weight percent, are effective hydrocracking catalysts. Other suitable carrier or supports include acidic supports such as: silica-alumina, silica-magnesia, and other well known cracking catalyst bases, the acid clays, fluorided alumina, and mixtures of organic oxides, such as alumina, silica, zirconia and titania, having sufficient acidic properties providing high cracking activity, and a mixture of support materials. Thus, for example, a zeolite and an alumina can be blended together as a support material in varying proportions which support materials contain various metals deposited thereon.

Other catalysts are supported hydrogenation catalysts comprising a Group VIII metal in the Periodic Table, such as nickel, cobalt, iron or one of the platinum group metals such as palladium, platinum, iridium, or ruthenium on a suitable support. Generally it is preferred than an oxide or sulfide of a Group VIII metal (particularly iron, cobalt or nickel) be present in mixture with an oxide or sulfide of a Group VI-B metal (preferably molybdenum or tungsten). A suitable support is alumina.

Typical dehydrogenation or reforming catalysts are alumina, having a platinum group metal component deposited thereon or composited therewith. Particularly active reforming catalysts also contain one or more components selected from the group of tin, rhenium and germanium.

The following examples are presented for the purpose of illustrating the beneficial effects of the apparatus of the present invention for loading catalyst particles into a reaction zone. It is understood that the present invention is not intended to be limited, beyond the scope and spirit of the appended claims, to the operating conditions, catalysts and reaction zone configuration as utilized within the examples.

EXAMPLE I

A 2 foot diameter vessel was selected to be loaded with 1/16 inch diameter alumina catalyst spheres by means of the conventional prior art method of sock loading which is hereinabove described and also by means of the loading device of the present invention to compare the ability of the two methods to maximize the apparent bulk density (ABD) of the loaded catalyst. The catalyst particles loaded with the prior art sock method had an apparent bulk density (ABD) of 0.499 g/cc., while the catalyst loaded with the device of the present invention demonstrated an ABD of 0.534 g/cc. This increase in ABD is a 7.1% increase over the prior art method. The comparison of the catalyst loading methods of this example is presented in the following Table I.

TABLE I

Apparent Bulk Density (ABD) Comparison
For 1/16" Diameter Spherical Catalyst Particles

|  | Sock Method | Catalyst Loading Device Of The Present Invention | Increase In ABD, % |
|---|---|---|---|
| ABD, g/cc. | 0.499 | 0.534 | 7.1 |

EXAMPLE II

This example utilized the same vessel and loading techniques as those of Example I. However, the catalyst particles selected for use in the example were 1/32 inch diameter extrudates which had a length to diameter ratio of from about 6.5 to about 8. The ABD of the extrudate catalyst which was loaded by the sock method and the loading device of the present invention, was found to be 0.589 g/cc. and 0.652 g/cc., respectively. This increase in ABD represents a 12.4% increase over the prior art method. The comparison of the catalyst loading methods of this example is presented in the following Table II.

TABLE II

Apparent Bulk Density (ABD) Comparison
For 1/32" Diameter Extrudate Catalyst Particles

|  | Sock Method | Catalyst Loading Device Of The Present Invention | Increase In ABD, % |
|---|---|---|---|
| ABD, g/cc. | 0.589 | 0.652 | 12.4 |

According to the present invention, the catalyst particles are loaded into a reaction zone utilizing a dispensing apparatus which comprises in combination a storage container and a rotatable discharge pipe extending downwardly therefrom, said pipe being a rotatable discharge member communicating with said storage container and mounted for rotation relative to said storage container, said discharge member being generally tubular and having closed ends and an opening in its center for receiving said particulate material from said storage container, said discharge member including elongated discharge openings along portions of its length between its center and each of its ends, said openings being generally tapered and having an increasing width in an outwardly extending direction, the minimum width of said openings being at least 125% of the nominal diameter of the particulate material being distributed.

Commercial separation zone vessels are also suitably loaded with adsorbent particulates in a manner utilizing the dispensing apparatus of the present invention. Commercial separation zone vessels vary in width or diameter from about 1 foot to about 15 feet or more, and have lengths of from about 5 feet to about 70 feet or more.

The rapid world-wide development of the petrochemical industry has lead to an increasing need for efficient methods of separating hydrocarbon species from each other. In some cases, such as the production of p-xylene, the desired objective is the separation of one particular pure hydrocarbon from a mixture of hydrocarbons. In others, such as production of mixed aromatics, n-paraffins, or straight-chain olefins, the objective is the separation of all members of one class of hydrocarbons from other classes.

Simple fractionation is generally not applicable to class separations and frequently not economic or even possible for recovery of single components. In these situations, the most common separative technique in commercial use has been the application of selective solvents in operations such as liquid-liquid extraction, azeotropic distillation and extractive distillation. Crystallization has been employed commercially in a few specific cases, such as recovery of p-xylene and naphthalene. It is restricted, however, to systems in which the desired component has a relatively high freezing point and does not form solid solutions with the other components. Even in these cases, the extent of separation is limited by formation of eutectic mixtures.

Adsorption on solid adsorbent particulates or simply, "adsorbents", offers potential advantages over other separative methods in a number of specific applications. These advantages are derived, in part, from the development of adsorbents showing unique selectivities for separating specific components and in part from the use of a flow scheme and adsorbent loading which permits a highly efficient use of the absorbent.

Adsorbents are known which are more selective in their ability to separate certain chemical species than any known solvents. In fact, in some cases, separations can be made which are impossible to accomplish by known methods of solvent extraction or extractive distillation. The greater versatility of adsorbents is presumably related to the fact that the solid structure allows localization and orientation of stronger force fields at the surface than are possible in the continuous phase of solvent systems.

An example of the unique possible properties of adsorbents is provided by the well-known use of 5-Angstrom molecular sieves to separate straight-chain hydrocarbons from branched-chain and cyclic structures. Both natural and synthetic aluminosilicates may be selected as adsorbents. Other suitable particulates which perform the desired separation function may also be selected.

The hereinabove described problems relating to the loading of catalysts and which problems were alleviated by the apparatus of the present invention are equally troublesome in the application of adsorbents in separation processes. However, we have found that the advantages of the utilization of the apparatus of the present invention are also manifested when adsorbents are loaded with the apparatus of the present invention.

Figure 1:
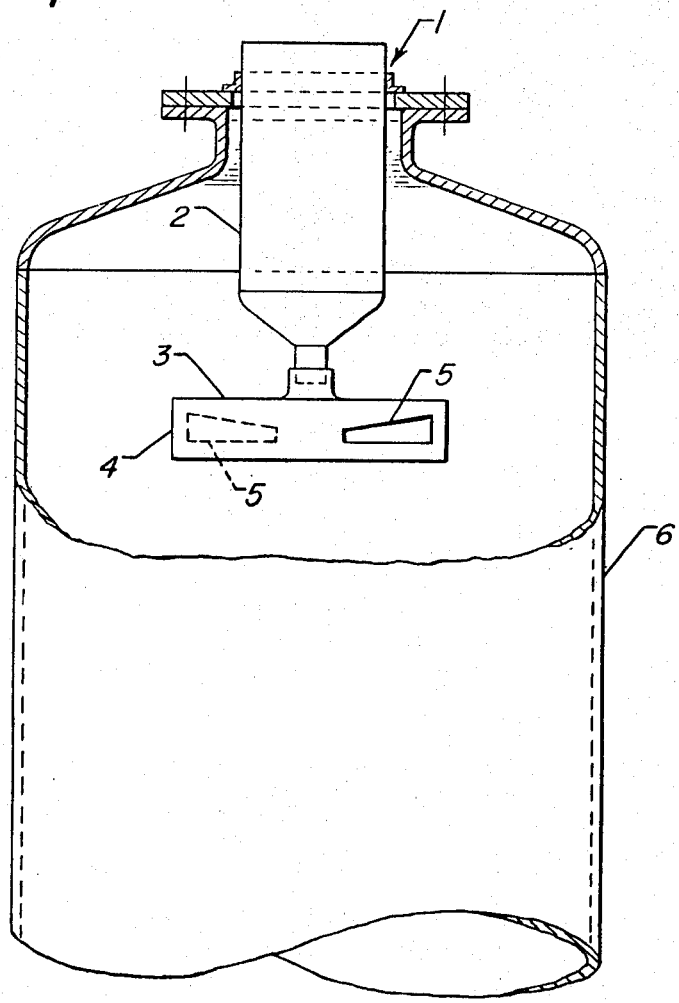
FIG. 1 is a longitudinal sectional view of a vessel with a dispensing apparatus in the preferred position.

Referring to FIG. 1, a dispensing apparatus for particulate material indicated generally at 1 includes a particulate hopper indicated generally at 2 into which the particulate material is dumped and stored prior to dispensing into vessel 6. A rotatable discharge member or rotor 3 extending downwardly from particulate hopper 2 and mounted for rotation relative to particulate hopper 2. The rotatable discharge member 3 is generally tubular having closed ends 4 and an opening in its center for receiving particulate material from particulate hopper 2. The rotatable discharge member 3 includes elongated discharge openings 5 along portions of its length between its center and each of its closed ends 4. The elongated discharge openings 5 are generally tapered and have an increasing width in an outwardly extending direction. The minimum width of the elongated discharge openings 5 are at least 125% of the nominal diameter of the particulate material being distributed.

During the operation of loading a vessel with the dispensing apparatus of the present invention, the rotatable discharge member or rotor is rotated at a sufficient speed such that the particulates leaving the outboard end of the rotor will just reach the vessel wall.

Figure 2:
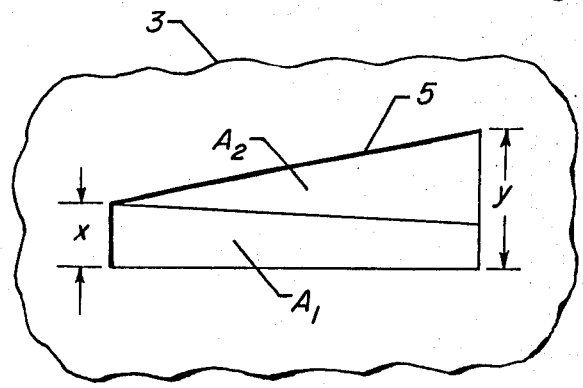
FIG. 2 is a detail of the discharge openings in the rotatable discharge member or rotor.

With reference to FIG. 2, we have found that dimension X will determine the slope of the top surface of the loaded particulate matter in a vessel and that the dimension Y will determine the catalyst loading rate. In theory, if the particulate matter were a perfect flowing substance, dimension X would be equal to zero. Since real particulate material is not a perfect flowing substance, the dimension X has to be finite. If particulate matter were allowed to flow through a rectangular orifice of length L and width X, the dimension X would be defined as the maximum opening in the orifice where the particulate flow would just begin. Dimension Y would still control the particulate flow rate. Therefore, the orifice would be divided into two sections, viz., $A_1$ and $A_2$. The section $A_1$ corrects for the fact that particulate are not a perfect substance and the section $A_2$ permits a uniform loading flux and controls the loading rate. Applying this theory to rotor operation, it is obvious that the centrifugal forces will increase further away from the center, but this increase will be linear. Hence, the distributing orifice in the rotor is divided as shown in FIG. 2. $A_1$ still corrects for the non-perfect flow of particulate matter and $A_2$ permits an equal loading flux and controls the particulate loading rate. It is to be noted that dimension X, of FIG. 2, still controls the slope of the top surface of the loaded particulate matter in the vessel and dimension Y controls the particulate loading rate. It is to be further noted that the orifice edge remains linear.

The foregoing examples and description illustrate the present invention and the benefits afforded through the utilization thereof.

We claim as our invention:

1. A dispensing apparatus for particulate material, the particles thereof having a nominal diameter comprising a storage container and a rotatable discharge pipe extending downwardly therefrom, said pipe being a rotatable discharge member communicating with said storage container, said discharge member being generally tubular and having closed ends and an opening in its center for receiving said particulate material from said storage container, said discharge member including elongated discharge openings along portions of its length between its center and each of its ends, said openings being located on the trailing side portion of said rotatable discharge member, said openings being generally tapered and having an increasing width in an outwardly extending direction, the minimum width of said openings being at least 125% of the nominal diameter of the particulate material being distributed.

2. A dispensing apparatus for particulate material, the particles thereof having a nominal diameter comprising a storage container and a rotatable discharge pipe extending downwardly therefrom, said pipe being a rotatable discharge member communicating with said storage container, said discharge member being generably tubular and having closed ends and an opening in its center for receiving said particulate material from said storage container, said discharge member including elongated dicharge openings along portions of its length between its center and each of its ends, said openings being located on the trailing side portion of said rotatable discharge member, said openings being generally tapered and having an increasing width in an outwardly extending direction, the minimum width of said openings being at least 125% of the nominal diameter of the particulate material being distributed and the maximum width of said openings being sufficient to permit said particulate material to be loaded at a rate of from about 100 to about 1500 lb/hr-ft$^2$.

3. A method for loading particulate material into an annular vessel and distributing said particulate material, at substantially the same rate, uniformly across the area of said vessel by means of a dispensing apparatus comprising a storage container and a rotatable discharge pipe extending downwardly therefrom, said pipe being a rotatable discharge member communicating with said storage container and mounted for rotation relative to said storage container, said discharge member being generally tubular and having closed ends and an opening in its center for receiving said particulate material from said storage container, said discharge member including elongated discharge openings along portions of its length between its center and each of its ends, said openings being generally tapered and having an increasing width in an outwardly extending direction, the minimum width of said openings being at least 125% of the nominal diameter of the particulate material being distributed.

4. A method for loading particulate material into an annular vessel and distributing said particulate material, at substantially the same rate, uniformly across the area of said vessel by means of a dispensing apparatus comprising a storage container and a rotatable discharge pipe extending downwardly therefrom, said pipe being a rotatable discharge member communicating with said storage container and mounted for rotation relative to said storage container, said discharge member being generally tubular and having closed ends and an opening in its center for receiving said particulate material from said storage container, said discharge member including elongated discharge openings along portions of its length between its center and each of its ends, said openings being generally tapered and having an increasing width in an outwardly extending direction, the minimum width of said openings being at least 125% of the nominal diameter of the particulate material being distributed and the maximum width of said openings being sufficient to permit said particulate material to be loaded at a rate of from about 100 to about 1500 lb/hr-ft$^2$.

5. The method of claim 3 further characterized in that said particulate material is catalyst.

6. The method of claim 3 further characterized in that said vessel is a hydrocarbon conversion zone.

7. The method of claim 3 further characterized in that said vessel is a hydrocarbon separation zone.

8. The method of claim 4 further characterized in that said particulate material is catalyst.

9. The method of claim 4 further characterized in that said vessel in a hydrocarbon conversion zone.

10. The method of claim 4 further characterized in that said vessel is a hydrocarbon separation zone.

11. A dispensing apparatus for particulate material the particles thereof having a nominal diameter comprising a storage container and a rotatable discharge pipe extending downwardly therefrom, said pipe being a rotatable discharge member communicating with said storage container and mounted for rotation relative to said storage container, said discharge member being generally tubular and having closed ends and an opening in its center for receiving said particulate material from said storage container, said discharge member including elongated discharge openings along portions of its length between its center and each of its ends, said openings being generally tapered and having an increasing width in an outwardly extending direction, the minimum width of said openings being at least 125% of said nominal diameter of the particulate material being distributed.

12. A method for loading particulate material the particles thereof having a nominal diameter into a vessel and distributing said particulate material, at substantially the same rate, uniformly across the area of said vessel by means of a dispensing apparatus comprising a storage container and a rotatable discharge pipe extending downwardly therefrom, said pipe being a rotatable discharge member communicating with said storage container and mounted for rotation relative to said storage container, said discharge member being generally tubular and having closed ends and an opening in its center for receiving said particulate material from said storage container, said discharge member including elongated discharge openings along portions of its length between its center and each of its ends, said openings being located at least on the trailing side portion of said rotatable discharge member, said openings being generally tapered and having an increasing width in an outwardly extending direction, the minimum width of said openings being at least 125% of said nominal diameter of the particulate material being distributed.

13. The method of claim 12 further characterized in that said vessel is a hydrocarbon conversion reaction zone.

14. The method of claim 12 further characterized in that said vessel is circular.

15. The method of claim 12 further characterized in that said vessel is a hydrocarbon separation zone.

16. The method of claim 12 further characterized in that said vessel is a conversion zone.

17. The method of claim 12 further characterized in that said vessel is a separation zone.

* * * * *